(No Model.)
J. D. PERRY.
POTATO DIGGER.
No. 598,389.    Patented Feb. 1, 1898.
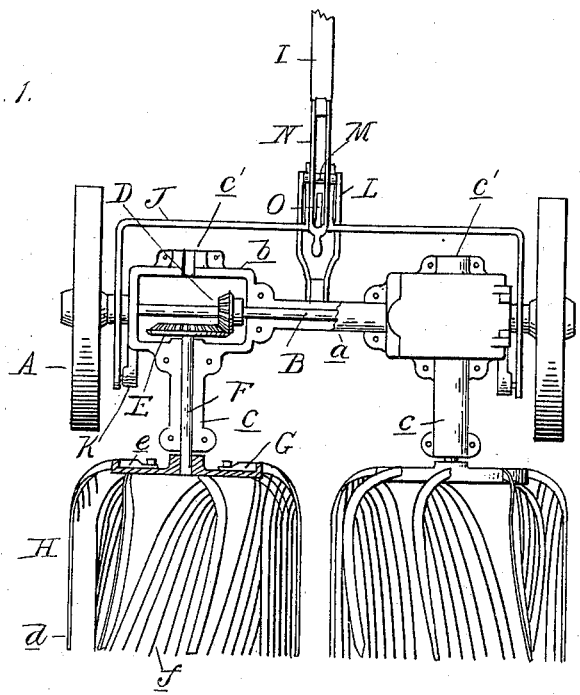
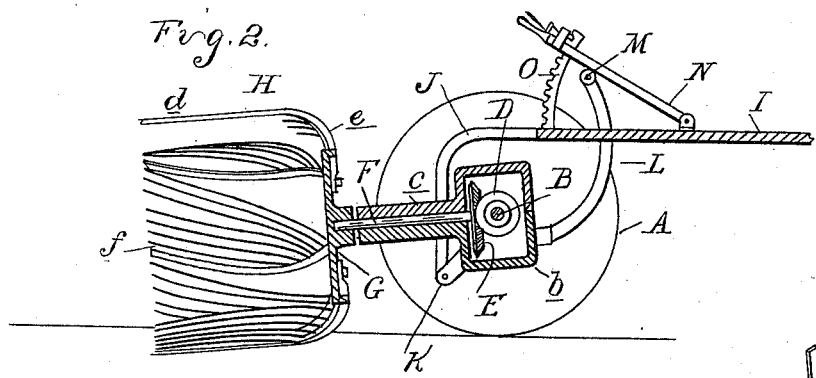
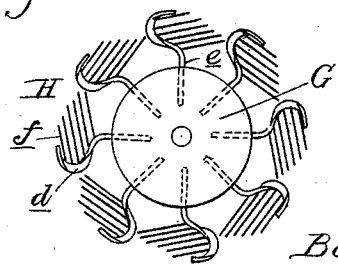
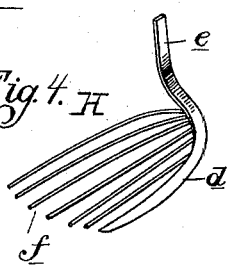
Witnesses
Inventor
Judson D. Perry
By
Attys.
THE NORRIS PETERS CO., PHOTO-LITHO., WASHINGTON, D. C.

UNITED STATES PATENT OFFICE.

JUDSON D. PERRY, OF ELM, MICHIGAN.

POTATO-DIGGER.

SPECIFICATION forming part of Letters Patent No. 598,389, dated February 1, 1898.

Application filed March 15, 1897. Serial No. 627,566. (No model.)

*To all whom it may concern:*

Be it known that I, JUDSON D. PERRY, a citizen of the United States, residing at Elm, in the county of Wayne and State of Michigan, have invented certain new and useful Improvements in Potato-Diggers, of which the following is a specification, reference being had therein to the accompanying drawings.

The invention consists in the peculiar construction of a rotary axially-drawn cage, and, further, in the peculiar construction, arrangement, and combination of parts, as more fully hereinafter described and claimed.

In the drawings, Figure 1 is a sectional plan view of my potato-digger. Fig. 2 is a vertical longitudinal section thereof. Fig. 3 is a diagram rear elevation of one of the cages. Fig. 4 is a perspective view of one of the scoops.

A are the ground-wheels.

B is the connecting-axle, and C is a frame supported on the axle, preferably a metallic box-frame, through which the axle passes, comprising the bearings $a$ and one or more enlargements or casings $b$. These casings inclose the bevel-gears D and E, the former being secured to the axle and the latter to rearwardly-extending shafts F, said shafts being journaled in the rearward extension $c$ of the frame.

G are heads secured upon the shafts F. To these heads are secured a series of scoops H, comprising the cutting-blades $d$, having the securing-shanks $e$ extending radially from the head and the tines $f$ secured to said blade and extending rearwardly. The blades $d$ are preferably shaped so as to make a drawing cut through the soil when the machine travels forward and the head G is rotated. The tines $f$ are also bent to give a slightly-spiral shape to the scoop. The heads G and scoop H together form a rotary cage partially closed at its forward end and open at its rear end.

I is the draft-pole secured to the yoke-frame J, which is pivotally secured to downwardly and rearwardly extending arms K on the frame C.

L is a forwardly and upwardly extending bifurcated arm on the frame C, which embraces the pole and carries at its upper end a roller M.

N is a lever pivoted at one end to the pole in front of the arm L and extending rearward over the roller M.

O is a notched segment secured to the pole, to which the lever N is adjustably locked.

In practice the operation of the potato-digger is as follows: The cage is raised or lowered by means of the lever N, which bears against the roller M and when moved rocks the frame C on its bearings on the axle. As the pivotal point of the draft connection is below and in rear of the axle, the tendency is to draw the cage into the soil. In the forward movement of the machine the cage is rotated, forcing the scoops H to cut through the soil beneath the potatoes and carrying them up within the cage, while the vines are left on the outside. As the scoops are lifted above ground, the soil which is lifted up with the potatoes sifts out between the tines, while the slightly-spiral form given to the scoop causes the potatoes to roll to the rear, depositing them freed from the soil on top of the ground.

While I have shown a machine provided with two cages, if desired but a single cage may be employed, or more than two. Furthermore, the machine may be employed for other purposes besides potato-digging. Thus it may be used as a pulverizer by simply running it through the soil, the scoop H acting to cut up and stir the soil. If desired, to better accomplish this work the head G may be taken off from the shaft F and another head substituted carrying blades especially designed for the work of pulverizing. Again, the frame of the machine may be employed for still other purposes by providing it with forwardly-extending shafts journaled in the bearings $c'$, (shown in Fig. 1,) said shafts having bevel-gears meshing with the gears D on the axle. These shafts may be used for driving the sickle-bar of a mowing-machine attachment, which may be detachably secured to the frame. For all of these various attachments and uses the frame-draft connections and adjusting-lever N remain the same.

What I claim as my invention is—

1. In a potato-digger, an axially-drawn rotary cage, comprising a head and a series of digging-scoops arranged around and secured to said head having rearwardly-extending tines.

2. In a potato-digger, an axially-drawn rotating cage, comprising a head and a series of digging-scoops secured thereto having rearwardly-extending tines inclined to roll the potatoes toward the rear of the cage as the scoops are lifted above the ground.

3. In a potato-digger, an axially-drawn rotary cage, comprising a head and a series of digging-scoops arranged around and secured to said head, each consisting of the cutting-blade $d$ secured to the head by the shanks $e$ and the tines $f$ bent to form a slightly-spiral shape to the scoop.

4. In an agricultural implement the combination with the wheeled axle, a frame pivoted thereon and the soil-operating device supported by said frame in rear of the axle, of a draft-pole, a yoke-frame secured to said pole pivoted to said frame below and in rear of the axle, an arm extending upward from said frame forward of the axle and a vertically-adjustable lever secured to the pole and bearing upon the upper end of said arm.

5. In an agricultural implement, the combination with the wheeled axle, a frame pivoted thereon and the soil-operating device supported from said frame in rear of the axle, of a draft-pole, a yoke-frame secured to said pole and pivoted to said frame below the axle, the bifurcated arm L extending upward from said frame forward of the axle and embracing said pole, the roller M at the upper end of said arm, the lever N pivoted to said pole and bearing on the roll M, and the segment O to which said lever is adjustably locked.

In testimony whereof I affix my signature in presence of two witnesses.

JUDSON D. PERRY.

Witnesses:
OTTO F. BARTHEL,
M. B. O'DOGHERTY.